United States Patent [19]
Naito et al.

[11] Patent Number: 6,061,172
[45] Date of Patent: May 9, 2000

[54] ACTIVE OPTICAL FIBER AND OPTICAL FIBER AMPLIFIER

[75] Inventors: Takao Naito; Naomasa Shimojoh; Takafumi Terahara, all of Kawasaki, Japan

[73] Assignee: Fujitsu Limited, Kawasaki, Japan

[21] Appl. No.: 09/162,144

[22] Filed: Sep. 29, 1998

[30] Foreign Application Priority Data

Apr. 27, 1998 [JP] Japan .................................. 10-117041

[51] Int. Cl.[7] ....................................................... H01S 3/00
[52] U.S. Cl. ............................................................. 359/341
[58] Field of Search ................................. 359/341; 372/6

[56] References Cited

U.S. PATENT DOCUMENTS

| 5,136,420 | 8/1992 | Inagaki et al. . | |
|---|---|---|---|
| 5,138,483 | 8/1992 | Grasso et al. . | |
| 5,712,715 | 1/1998 | Erdogan et al. | 359/8 |
| 5,757,540 | 5/1998 | Judkins et al. | 359/341 |

FOREIGN PATENT DOCUMENTS

| 2-153327 | 6/1990 | Japan . |
|---|---|---|
| 3-135081 | 6/1991 | Japan . |
| 4-191826 | 7/1992 | Japan . |

*Primary Examiner*—Mark Hellner
*Attorney, Agent, or Firm*—Staas & Halsey, LLP

[57] ABSTRACT

The present invention aims at providing an active optical fiber and an optical fiber amplifier, in which a conversion efficiency of pumping light to be input into the active optical fiber is increased to thereby improve optical amplification characteristic. To this end, the active optical fiber of the present invention is formed with fiber gratings arranged over a predetermined region along the longitudinal direction within the optical fiber doped with a rare earth element, and transmitting signal light and reflecting pumping light. Further, the optical fiber amplifier of the present invention is constituted to comprise a pumping light source for generating pumping light, and a multiplexer for multiplexing signal light and the pumping light to thereby output them into one end of the active optical fiber. Thus, the pumping light is reflected by the fiber gratings so as to go and return within the active optical fiber, thereby improving the conversion efficiency of the pumping light.

46 Claims, 13 Drawing Sheets

(a) POWER DISTRIBUTION OF PUMPING LIGHT (b) DISTRIBUTION OF FIBER GRATINGS (a) POWER DISTRIBUTION OF PUMPING LIGHT (b) DISTRIBUTION OF FIBER GRATINGS (a) POWER DISTRIBUTION OF PUMPING LIGHT (b) DISTRIBUTION OF FIBER GRATINGS (a) POWER DISTRIBUTION OF PUMPING LIGHT (b) DISTRIBUTION OF FIBER GRATINGS

WAVELENGTH OF PUMPING LIGHT

WAVELENGTH OF PUMPING LIGHT

ACTIVE OPTICAL FIBER AND OPTICAL FIBER AMPLIFIER

BACKGROUND OF THE INVENTION (1) Field of the Invention

The present invention relates to an active optical fiber doped with rare earth element and an optical fiber amplifier, and more particularly to an active optical fiber and an optical fiber amplifier, in which the conversion efficiency of pumping light input into the active optical fiber is increased to improve optical amplification characteristics.

(2) Related Art

In conventional long-distance optical transmission systems, the transmission has been conducted by converting an optical signal into an electric signal, and by adopting an optical regenerating repeater which has functions of retiming, reshaping and regenerating. However, in recent years, optical fiber amplifiers have been put to practical use, so that an optical amplifying and repeating transmission method is now put under consideration in which an optical fiber amplifier is used as a linear repeater. By replacing an optical regenerating repeater with an optical amplifying repeater, the number of parts in the repeater can be reduced to a considerable extent, so that reliability is increased and substantial cost reduction can be expected.

Further, as one choice for realizing an optical transmission system of large-capacity, attention has been directed to a wavelength-division multiplexing (WDM) optical transmission method in which two or more signal lights having different wavelengths are multiplexed and transmitted within a single transmission path.

In a WDM optical amplifying and repeating transmission method which is provided by combining the WDM optical transmission method with the optical amplifying and repeating transmission method, usage of an optical fiber amplifier makes it possible to collectively amplify the two or more signal lights having different wavelengths, thereby enabling economical, of large-capacity and long-distance optical transmission, with a simple construction.

FIG. 22 shows an example of basic construction of a conventional optical fiber amplifier (forward pumping).

In FIG. 22, a pumping light Lp output from a pumping light source 1 is multiplexed, at a multiplexer 2, with a signal light Ls from an input terminal T1, and then input into one end of an active optical fiber 3 depicted by a thick line. This active optical fiber 3 is the one doped with a rare earth element such as Erbium. When an optical fiber amplifier adopting this active optical fiber 3 is unsaturatedly operated, there can be obtained a flat gain wavelength characteristic, thereby realizing transmission of large capacity.

However, when the conventional optical fiber amplifier is unsaturatedly operated, only a part of the power of pumping light which is input into the active optical fiber 3 is used to excite the rare earth element, and the remaining large part of power of pumping light is leaked to the backward side of the active optical fiber. Concretely, approximately 70% of the power of pumping light input into the active optical fiber 3 may pass therethrough, and only about 30% of the power is used to excite the rare earth element. Thus, the conventional optical fiber amplifier has been defective, as having a lower pumping efficiency.

There are also known other conventional optical fiber amplifiers which are contemplated to improve the pumping efficiency, such as disclosed by U.S. Pat. No. 5,138,483. Shown in FIG. 23 is a constitution of this conventional optical fiber amplifier.

In FIG. 23, the optical fiber amplifier, which improved the pumping efficiency, is constituted by modifying the optical fiber amplifier shown in FIG. 22 with an optical reflector 4 which is additionally disposed at a backward side of the active optical fiber 3 (i.e., at an outer side of the end opposite to the input end of pumping light). This reflector 4 reflects the pumping light Lp, and transmits the signal light Ls. The pumping light Lp is reflected by the added reflector 4, to make one reciprocation within the active optical fiber 3, so as to improve the pumping efficiency. Concretely, approximately 50% of the power of input pumping light is used to excite the rare earth element.

However, in the aforementioned conventional optical fiber amplifier which is contemplated to improve the pumping efficiency, just the pumping efficiency may be conversely deteriorated, since the power of the signal light Ls to be output from the optical fiber amplifier is reduced such as due to an insertion loss itself of the added optical reflector 4 and a loss at a part for coupling the active optical fiber 3 to the optical reflector 4.

It is therefore desired to improve the conversion efficiency of the pumping light in the conventional optical fiber amplifier, while enabling high-powerization of output light from the optical fiber amplifier. It is also desired to attain reduction of a noise factor of the optical fiber amplifier, in addition to high-powerization of output light.

In order to high-powerize the optical fiber amplifier, it is required such as: that a sufficient power of pumping light does exist in the part located at an output side of signal light of the active optical fiber; and that an internal loss at an output part of the optical fiber amplifier be reduced.

Further, in order to reduce the noise factor of the optical fiber amplifier, it is required such as: that a sufficient power of pumping light does exist in that part of the active optical fiber which is located at an input side of signal light; and that an internal loss at an input part of the optical fiber amplifier be reduced.

It is also noticed that the power of output light and the noise factor both of the optical fiber amplifier have characteristics different from each other, depending on the wavelength of the pumping light. Namely, with respect to the wavelength of the pumping light, the power of output light of optical fiber amplifier has a characteristic shown in FIG. 24, while the noise factor of the optical fiber amplifier has one shown in FIG. 25. It is therefore seen that a relatively long wavelength of pumping light is preferred for increasing the power of output light, whereas a relatively short wavelength is preferred for reducing the noise factor.

SUMMARY OF THE INVENTION

The present invention has been carried out in view of the aforementioned points, and it is therefore an object of the present invention to provide an active optical fiber and an optical fiber amplifier, each of which has an increased conversion efficiency of pumping light and an optical amplification characteristic of high power and reduced noise.

To this end, the present invention provides an active optical fiber doped with rare earth element, comprising a pumping light reflection area arranged over a predetermined region along the longitudinal direction within the optical fiber, the pumping light reflection area being provided with diffraction gratings which transmit a signal light and reflect pumping light. Further, the optical fiber amplifier of the present invention is constituted to comprise the aforementioned active optical fiber, at least one pumping light source for generating pumping light, and at least one multiplexing part for inputting the pumping light into the active optical fiber.

According to such active optical fiber and optical fiber amplifier, the pumping light input into the active optical fiber is reflected by the diffraction grating arranged in the pumping light reflection area, so as to go and return within the active optical fiber. Thus, the signal light is amplified at a high pumping efficiency. Further, since the diffraction grating for reflecting the pumping light is formed within the active optical fiber, the loss within the pumping light reflection area is restricted to a lower degree.

Therefore, it becomes possible to realize high-powerization of signal light from the optical fiber amplifier thereby enabling improvement of pumping efficiency, since there do not exist such as insertion loss and coupling loss due to optical reflector as compared to a conventional optical fiber amplifier which is externally added with an optical reflector.

The pumping light reflection area may comprise diffraction gratings, arranged over the entire longitudinal direction region of the optical fiber, or arranged exclusively adjacent to both ends of the optical fiber, respectively.

Further, the pumping light reflection area may be provided with two or more of the diffraction gratings having central reflection wavelengths different from each other, in the longitudinal direction of the optical fiber. Concretely, it is preferable that the diffraction gratings of the pumping light reflection area include a diffraction grating arranged adjacent to a signal light input end of the optical fiber and having a central reflection wavelength corresponding to a shorter side wavelength of a wavelength range of the pumping light, and a diffraction grating arranged adjacent to a signal light output end of the optical fiber and having a central reflection wavelength corresponding to a longer side wavelength of a wavelength range of the pumping light.

By arranging two or more diffraction gratings, having the central reflection wavelengths different from each other, in the longitudinal direction of the optical fiber, and particularly by rendering the central reflection wavelength of the diffraction grating adjacent to the signal light input end, to correspond to the pumping light of shorter wavelength, it becomes possible to reduce the noise factor. Further, by rendering the central reflection wavelength of the diffraction grating adjacent to the signal light output end, to correspond to the pumping light of longer wavelength, it becomes possible to realize high-powerization and to improve the pumping efficiency.

In addition, the pumping light reflection area may be provided with two or more of the diffraction gratings having reflectances per unit length different from each other, in the longitudinal direction of the optical fiber. Concretely, it is preferable that, when the pumping light is input into the one end of the optical fiber in one direction, and a diffraction grating arranged adjacent to one end of the optical fiber has a reflectance per unit length lower than that of a diffraction grating arranged adjacent to the opposite end of the optical fiber. Further, a diffraction grating arranged at a central part of the optical fiber has a reflectance per unit length lower than that of the diffraction grating arranged adjacent to the one end of the optical fiber.

As described above, for the reflectance per unit length in the longitudinal direction of the optical fiber, in either case of forward pumping or backward pumping, by establishing the reflectance of the diffraction grating adjacent to one end of optical fiber, into which the pumping light is input, to be lower, and by establishing the reflectance of the diffraction grating adjacent to the other end to be higher, the power of pumping light existing at the pumping light input side is increased, enabling to realize high-powerization and to improve the pumping efficiency.

The pumping light reflection area may comprise a diffraction grating arranged in a restricted portion only in the longitudinal direction of the optical fiber. Concretely, when the pumping light is input into one end of the optical fiber in one direction, a diffraction grating may be exclusively arranged adjacent to the opposite end of the optical fiber opposite to one end of the optical fiber; or when the pumping light is input into both ends of the optical fiber in one and the opposite directions, respectively, a diffraction grating may be exclusively arranged at the central part of the optical fiber, Further, in case of bi-directional pumping, the diffraction grating at the central part of the optical fiber may have a reflection wavelength range which covers two or more wavelengths different from each other. By such a constitution, it is also possible to improve the pumping efficiency.

Another configuration of the optical fiber amplifier according to the present invention comprises: at least one pumping light source for generating a pumping light, a first active optical fiber doped with rare earth element, a first light reflection device for reflecting the pumping light input into one end of the first active optical fiber and for transmitting a signal light, a second active optical fiber doped with rare earth element, a second light reflection device for reflecting the pumping light input into one end of the second active optical fiber and for transmitting the signal light, and an optical circulator, which transmits the pumping light from the pumping light source into the one end of the first active optical fiber in one direction only, and which transmits the pumping light reflected by the first light reflection device and returned toward the one end of the first active optical fiber, into the one end of the second active optical fiber in one direction only, wherein the signal light is amplified by propagating through the first and second active optical fibers while transmitting the first and second light reflection devices.

In the optical fiber amplifier having such a constitution, the pumping light generated by the pumping light source is input into the first active optical fiber via the optical circulator, and is reflected by the first light reflection device so as to return to the optical circulator. The thus returned pumping light is input into the second active optical fiber through the optical circulator, and is reflected by the second light reflection device so as to return to the optical circulator. Thus, the pumping light is rendered to make one-reciprocation through the first and second active optical fibers, so that it becomes possible to improve the conversion efficiency of pumping light.

Further, the first and second light reflection devices preferably comprise diffraction gratings which transmit the signal light and reflect the pumping light, and are arranged over predetermined regions along the longitudinal direction within the first and second active optical fibers, respectively. By such a constitution, the loss at the first and second light reflection devices can be restricted to a lower degree, thereby realizing an optical fiber amplifier having a higher pumping efficiency.

Moreover, the optical circulator may be: a 3-port optical circulator which transmits the pumping light reflected by the second light reflection device and returned to the one end of the second active optical fiber, to the pumping light source in one direction only; or a 4-port optical circulator which transmits such reflected and returned pumping light to an optical terminator. In case of 3-port optical circulator, the pumping light source is to be provided with an isolator for transmitting the pumping light to the optical circulator in one direction only.

Further objects, features and advantages of the present invention will become more apparent from the following description of preferred embodiments when read in conjunction with the accompanying drawings.

DETAILED DESCRIPTION OF THE INVENTION

There will be described hereinafter the embodiments according the present invention, with reference to the accompanying drawings.

Figure 1:
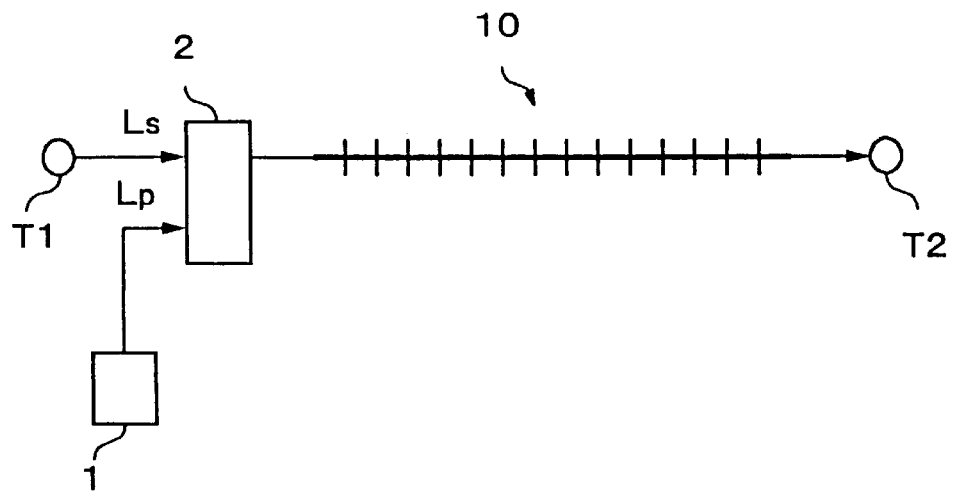
FIG. 1 is a schematic view showing a constitution of an optical fiber amplifier according to a first embodiment of the present invention.

FIG. 1 is a schematic view showing a constitution of an optical fiber amplifier according to a first embodiment. Like reference numerals as used for the aforementioned conventional optical fiber amplifiers are used to denote corresponding elements in this figure, and the same rule applies correspondingly to the following, In FIG. 1, the optical fiber amplifier according to the present invention is constituted of: a pumping light source 1 for generating a pumping light Lp; a multiplexer 2 as a multiplexing part for multiplexing a signal light Ls with the pumping light Lp and outputting them; and an active optical fiber 10 which is input with the signal light Ls and pumping light Lp from the multiplexer 2, amplifies the signal light Ls, and outputs the same to an output terminal T2. Here is considered a case of forward pumping in which the pumping light Lp is input from the front side (i.e., the side from which the signal light Ls is input) of the active optical fiber 10.

The active optical fiber 10 is generally constituted of a fiber doped with rare earth element such as Erbium, and internally formed with gratings (fiber gratings) acting as diffraction gratings through a predetermined region along the longitudinal direction of fiber 10. Those parts formed with the fiber gratings act as pumping light reflection areas. In FIG. 1, the state where the fiber gratings are provided, is schematically shown by device of a plurality of line segments perpendicular to the optical fiber. Here, the fiber gratings shall be formed over the entire longitudinal region of the optical fiber.

Figure 2:
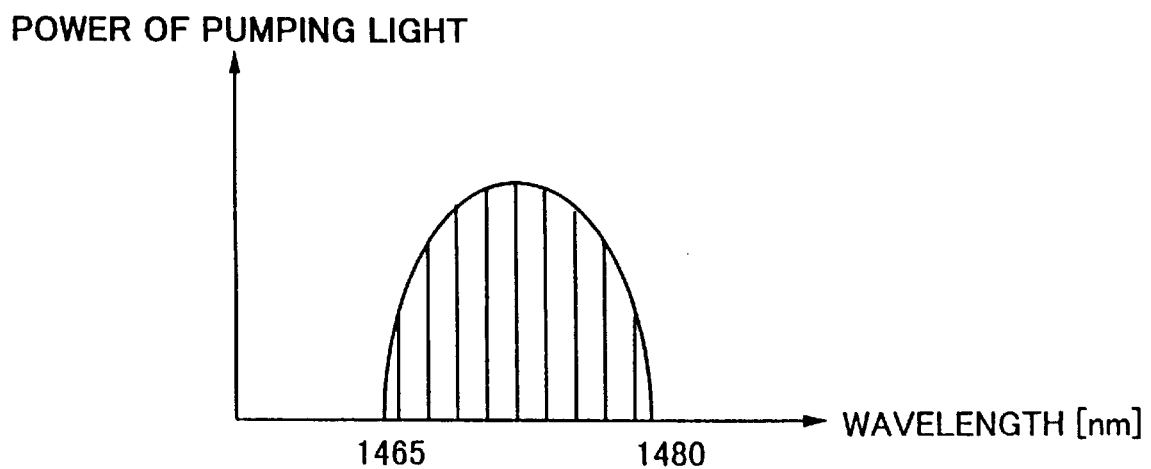
FIG. 2 is a diagram showing an output spectrum of a pumping light source in the first embodiment.

The pumping light source 1 generates the pumping light Lp having wavelength such as in 0.98 μm band or 1.48 μm band. There shall be adopted here a light source which generates in a multimode manner, and the power of pumping light shall have a spread within a certain wavelength range, as shown in a spectrum view of FIG. 2. FIG. 2 shows a case of pumping wavelength such as of 1.48 μm band, and the wavelength distribution is as wide as 10 to 20 nm. The wavelength distribution of the pumping light Lp can be widened such as by means of modulation of electric current to be injected into the light source. The generated pumping light Lp is sent to the multiplexer 2 such as via isolator not shown. Such an isolator is provided for preventing a return light reflected by the fiber gratings of the active optical fiber 10, from entering the pumping light source 1.

The multiplexer 2 is constituted such as of a general optical coupler, and connected between an input terminal T1 and one end of the active optical fiber 10. This multiplexer 2 functions to send the one end of the active optical fiber 10, a light obtained by multiplexing the signal light Ls of 1.55 μm wavelength band to be input via the input terminal T1 and the pumping light Lp from the pumping light source 1.

There will be explained hereinafter the aforementioned fiber grating, in detail.

Figure 3:
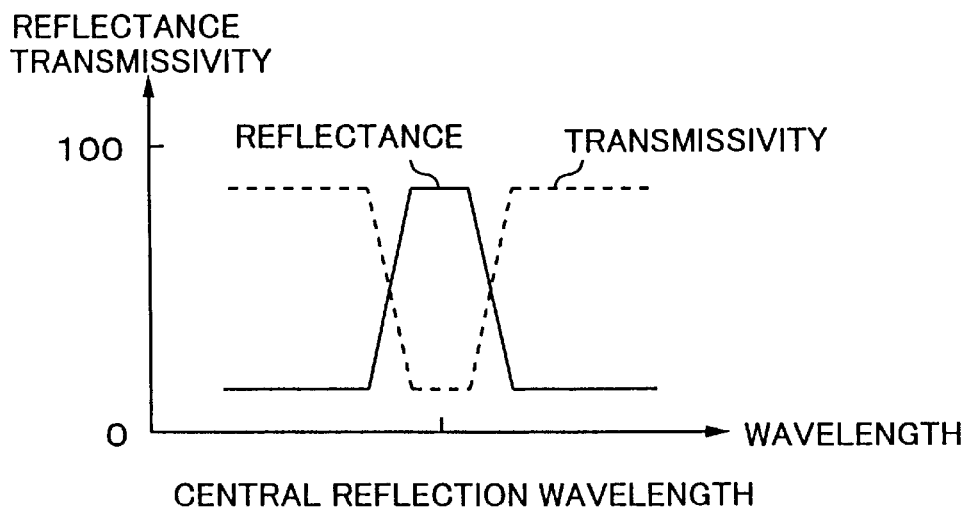
FIG. 3 is a diagram showing a reflectance and a transmissivity of a fiber grating relative to a wavelength in the first embodiment.

"Fiber grating" is prepared such as by irradiating ultraviolet rays to a core within an optical fiber from the outside, to thereby provide the core with a periodical variation of refractive index, which results in a filtering characteristic. FIG. 3 shows exemplary reflectance and transmissivity of fiber grating, relative to a wavelength. As shown in FIG. 3, the fiber grating has a predetermined central reflection wavelength. Further, by setting this central reflection wavelength to correspond to the wavelength of the pumping light, the fiber grating is rendered to have such a characteristic to reflect the pumping light input into the optical fiber, and to transmit the signal light. The central reflection wavelength can be set at a desired value by varying the pitch of gratings, and the reflectance can be set at a desired value such as by changing the number of gratings and the variation degree of refractive index.

There will be concretely explained hereinafter a power distribution of pumping light along the longitudinal direction of the optical fiber which is formed with the fiber gratings, with reference to the analytic model shown in FIG. 4.

Figure 4:
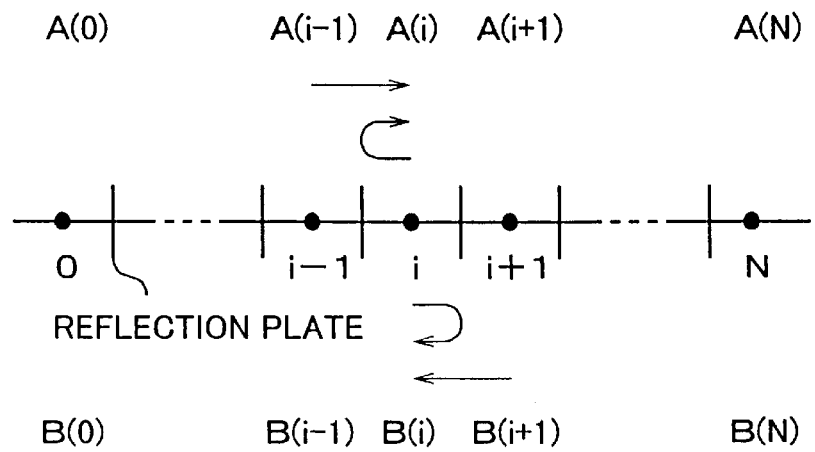
FIG. 4 is a diagram showing an analytic model for calculating a power distribution of pumping light within the active optical fiber of the first embodiment.

In the analytic model of FIG. 4, it is assumed that: N pieces of reflection plates are inserted in the optical fiber; the input direction of the power of pumping light is forward (i.e., the direction from the left to the right in the drawing); and respective values of the power of pumping light at each points (i=0, 1, ..., N) are A(i) in the forward direction and B(i) in the reverse direction (i.e., the direction from the right to the left in the drawing). Further, there is supposed the following, for simplifying the explanation:

transmission loss of optical fiber shall be neglected;
absorption of pumping light shall be neglected;
reflectance per unit length of fiber gratings shall be constant; and
power of pumping light is input in only one direction. Namely, the boundary condition is represented by the following equations (1) and (2).

$$A(0)=P \qquad (1)$$

and $$B(N)=0 \qquad (2),$$

wherein a value of input power of pumping light is supposed to be P. At this time, if the power of pumping light is in a steady state, the following relationships represented by equations (3) and (4) can be established:

$$A(i)=(1-r)\times A(i-1)+r\times B(i)(i=1,2,\ldots,N) \qquad (3),$$

and $$B(i)=r\times A(i)+(1-r)\times B(i+1)(i=0,1,\ldots,N-1) \qquad (4),$$

wherein reflectance for each of distributed reflection plates is supposed to be "r". By solving the equations (1) through (4), the following equations (5) and (6) can be obtained:

$$A(i)=[1+(N-i-1)\times r]\times P/[1+(N-1)\times r](i=0,1,\ldots,N) \qquad (5),$$

and $$B(i)=(N-1)\times r\times P/[1+(N-1)\times r](i=0,1,\ldots,N) \qquad (6).$$

Supposing the sum of the power of pumping light in the forward and reverse directions be C(i), C(i) is represented by the following equation (7):

$$C(i)=A(i)+B(i)=[1+(2N-2i-1)\times r]\times P/[1+(N-1)\times r]$$
$$(i=0,1,\ldots,N) \qquad (7).$$

From the equation (7), the power C(i) of pumping light at a point i becomes an arithmetic progression. Thus, the larger the reflectance r is, the higher power of pumping light exists near the input portion for the pumping light.

Figure 5:
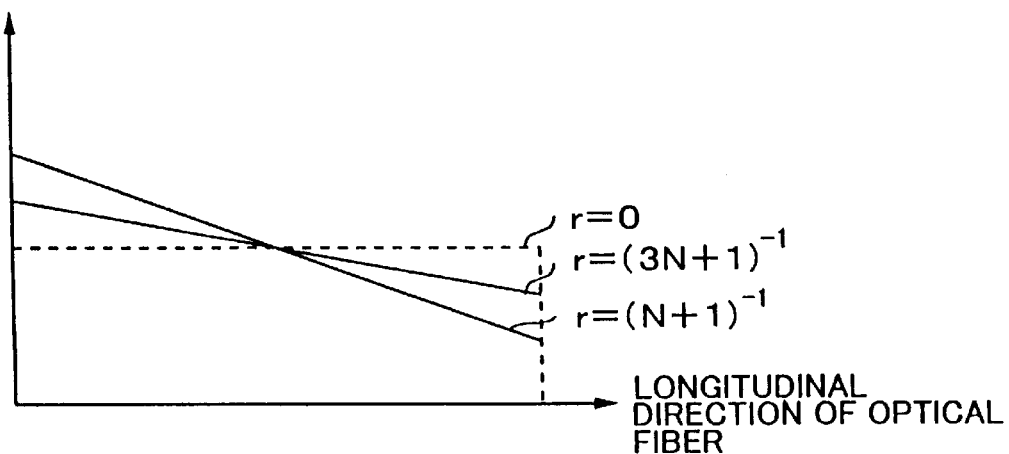
FIG. 5 is a diagram showing an exemplary calculation of a power distribution of pumping light within the active optical fiber of the first embodiment.
Figure 5:
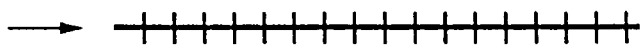

FIG. 5 shows an exemplary power distribution of the pumping light within the optical fiber when varying the reflectance of the fiber gratings, which is calculated according to the equation (7).

It is noted that the power distribution of the pumping light shown in FIG. 5 corresponds to the calculation result, where the fiber gratings are distributed over the entire longitudinal direction region of optical fiber and the reflectances of the gratings are uniform. From FIG. 5(a), it is seen that when each reflectance r is increased, the power of pumping light at the input side is increased and the power of pumping light at the output side is decreased. For comparison, FIG. 5(a) shows by a dotted line such a case that no fiber gratings are formed so that the reflectance r is 0 (r=0).

In this manner, it becomes possible to appropriately design the power distribution of the pumping light along the longitudinal direction of optical fiber, by treating the reflectance of the fiber gratings as a designing parameter.

In the above analytic model, the transmission loss of optical fiber and the absorption of pumping light have been neglected. However, such transmission loss and absorption of pumping light should exist in a practical active optical fiber, resulting in that the power of pumping light input into the active optical fiber decreases as the pumping light is transmitted through the optical fiber. Nevertheless, the length of active optical fiber generally ranges from several meters to several hundred meters, so that the attenuation degree of power of pumping light due to transmission loss is relatively small. Further, in case of an optical amplifier adopting an operating point where the input-output characteristic does not saturate, the attenuation degree of power of pumping light due to absorption of pumping light is smaller than the case adopting an operating point where the input-output characteristic saturates. Thus, it will be permitted to consider a practical active optical fiber, in a manner same with the above analytic model.

There will be explained hereinafter the operation of the first embodiment.

Upon generation of the pumping light Lp by the pumping light source 1, this light Lp is input, via the multiplexer 2, into one end of the active optical fiber 10. The pumping light Lp input into the active optical fiber 10 is reflected by the fiber gratings formed over the entire longitudinal direction region, causing such a state that a sufficient power of pumping light exists at the input side of the active optical fiber 10, as shown in FIG. 5(a). By virtue of this pumping light Lp, the rare earth elements within the active optical fiber 10 are rendered to get into a pumped state. Further, upon input of the signal light Ls from the input terminal T1 via the multiplexer 2 into one end of the active optical fiber 10, this signal light Ls is transmitted through the fiber gratings, with the light Ls being amplified by induced emission, and exits from the other end of active optical fiber 10 toward the output terminal T2.

According to the first embodiment as described above, the active optical fiber 10 is internally formed with the fiber gratings which reflect the pumping light Lp and transmit the signal light Ls, so that the pumping light Lp is reflected within the active optical fiber 10 to thereby go and return therein. Thus, there do not exist such as insertion loss and coupling loss due to optical reflector as compared to a conventional optical fiber amplifier which is externally added with an optical reflector. As a result, high-powerization of signal light from the optical fiber amplifier can be realized, thereby enabling improvement of pumping efficiency. Further, the fiber gratings are provided over the entire longitudinal direction region of the active optical fiber 10. Thus, in case of forward pumping, there exist a sufficient power of pumping light at the input side of the signal light Ls, so that the noise factor of optical fiber amplifier can be decreased. Moreover, the central reflection wavelengths and the reflectances of the fiber gratings are rendered to be uniform along the longitudinal direction, so that the manufacture of active optical fiber 10 can be facilitated and the length adjustment of active optical fiber 10 can be easily performed.

Figure 6:
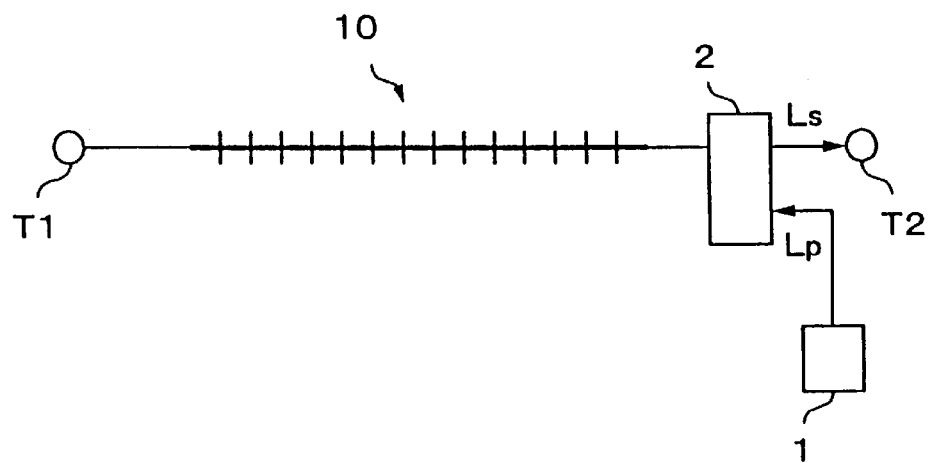
FIG. 6 is a diagram showing another exemplary constitution of the first embodiment in which a backward pumping is adopted.

In the above first embodiment, there has been explained a case of forward pumping. However, the present invention is not limited thereto. For example, it is possible to conduct a backward pumping such as shown in FIG. 6 in which the multiplexer 2 is coupled to the other side of the active optical fiber 10. In this case, a sufficient power of pumping light is rendered to exist at the exit side of signal light Ls, thereby providing an optical fiber amplifier having higher power. Although not shown, it is also applicable to provide two sets of the pumping light sources and multiplexers at both ends of the active optical fiber, respectively, thereby realizing bi-directional pumping in which each end of active optical fiber is input with respective pumping lights.

There will be explained hereinafter a second embodiment of the present invention.

Figure 7:
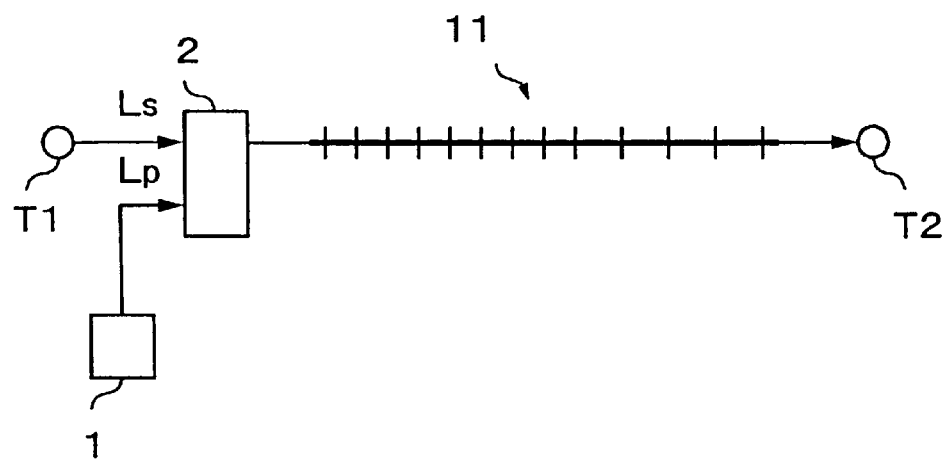
FIG. 7 is a schematic view showing a constitution of an optical fiber amplifier according to a second embodiment of the present invention.

FIG. 7 is a schematic view showing a constitution of an optical fiber amplifier according to a second embodiment of the present invention.

In FIG. 7, the constitution of this optical fiber amplifier is differentiated from that of the first embodiment in that the former adopts, instead of the active optical fiber 10, an active optical fiber 11 in which the central reflection wavelengths of the fiber gratings differ from each other along the longitudinal direction. Other constitution is identical with that of the first embodiment, so that explanation thereof is omitted.

The active optical fiber 11 is characterized in that it is formed with fiber gratings over the entire longitudinal direction region of optical fiber, such that the central reflection wavelengths of gratings at the input and output sides of the signal light Ls have different values. Concretely, the central reflection wavelength at the input side has a value corresponding to the shorter side wavelength of the wavelength range of the pumping light Lp generated at the pumping light source 1 (see FIG. 2), and the central reflection wavelength at the output side has a value corresponding to the longer side wavelength of the wavelength range of the pumping light Lp. In FIG. 7, the state of the central reflection wavelengths of fiber gratings is schematically shown correspondingly to the intervals of a plurality of line segments perpendicular to the optical fiber. Here, the input side and output side shall cover those regions including the central part of the optical fiber, respectively. Further, the reflectances of fiber gratings are supposed to be uniform through the longitudinal direction of optical fiber, similar to the first embodiment.

In such an active optical fiber 11, upon input of the pumping light Lp, which has a wavelength range in the order of 10 to 20 nm as described above, via the multiplexer 2 into one end (signal light input end) of the active optical fiber 11, the pumping light Lp at the shorter side wavelength of the wavelength range is mainly reflected by the signal light input end side while the pumping light Lp at the longer wavelength side is mainly reflected by the signal light output end side. Thus, the pumping light Lp of shorter wavelength is mainly distributed at the signal light input end side, and the pumping light Lp of longer wavelength is mainly distributed at the signal light output end side. Only, since the reflectances of fiber gratings are uniform through the longitudinal direction, the power distribution of pumping light (irrespectively of wavelength) is established such that a sufficient power of pumping light exists at the signal light input end side, similarly to that situation shown in FIG. 5(a).

Figure 24:
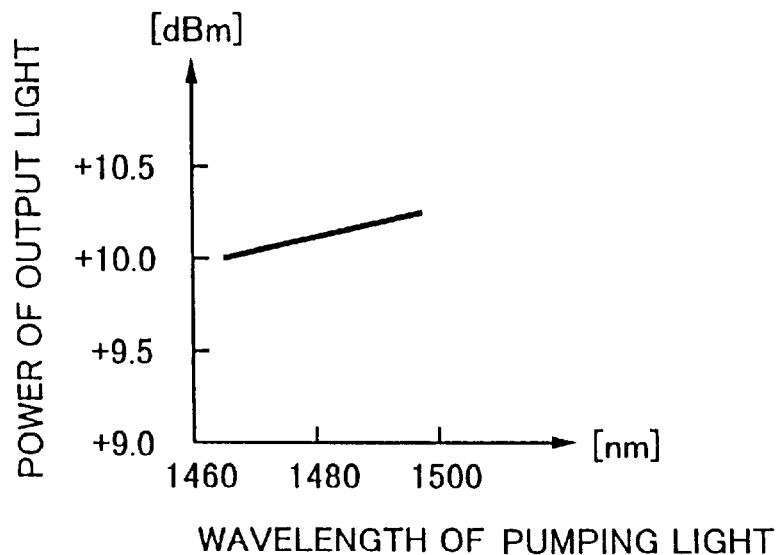
FIG. 24 is a diagram showing a relation of power of output light relative to a wavelength of pumping light.
Figure 25:
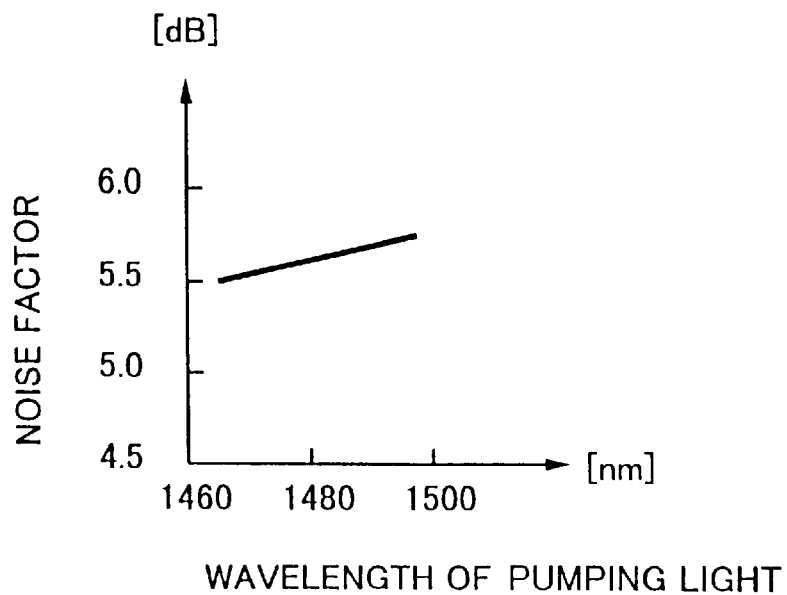
FIG. 25 is a diagram showing a relation of noise factor relative to a wavelength of pumping light.

Upon input of signal light Ls into the active optical fiber 11 under such a state, the signal light Ls is firstly amplified at the input end side based on the function of pumping light Lp of shorter wavelength, and then advances to the output end side so as to be amplified based on the function of pumping light Lp of longer wavelength. By amplifying the signal light Ls by the pumping light Lp of shorter wavelength, the noise factor is reduced, as shown in FIG. 25. Further, by amplifying the signal light Ls by the pumping light Lp of longer wavelength, the power of output light is increased, as shown in FIG. 24.

Therefore, according to this second embodiment adopting active optical fiber 11, generation of noises at signal light input side of active optical fiber 11 is restricted, and the optical amplification effect at the signal light output side is enhanced. Thus, there can be provided an optical fiber amplifier which exhibits a noise factor lower than and has output higher than those of the first embodiment.

Figure 8:
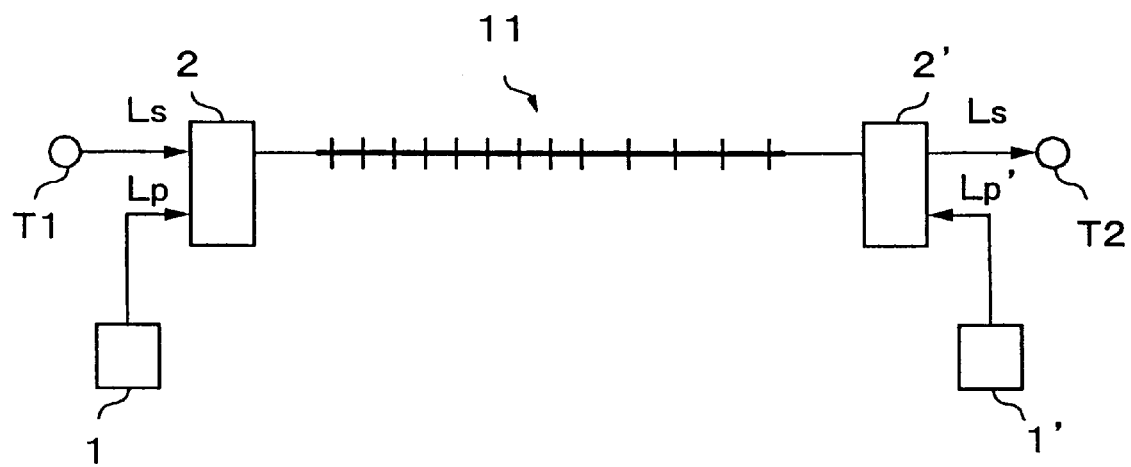
FIG. 8 is a diagram showing another exemplary constitution of the second embodiment in which bi-directional pumping is adopted.

In the second embodiment, there has been explained a case of forward pumping. However, it is possible to conduct a backward pumping. Further, it is also possible to conduct bi-directional pumping, by providing, in addition to the aforementioned constitution, another pumping light source 1' and another multiplexer 2' outside the signal light output end of active optical fiber 11 as shown in FIG. 8.

There will be explained hereinafter a third embodiment of the present invention.

Figure 9:
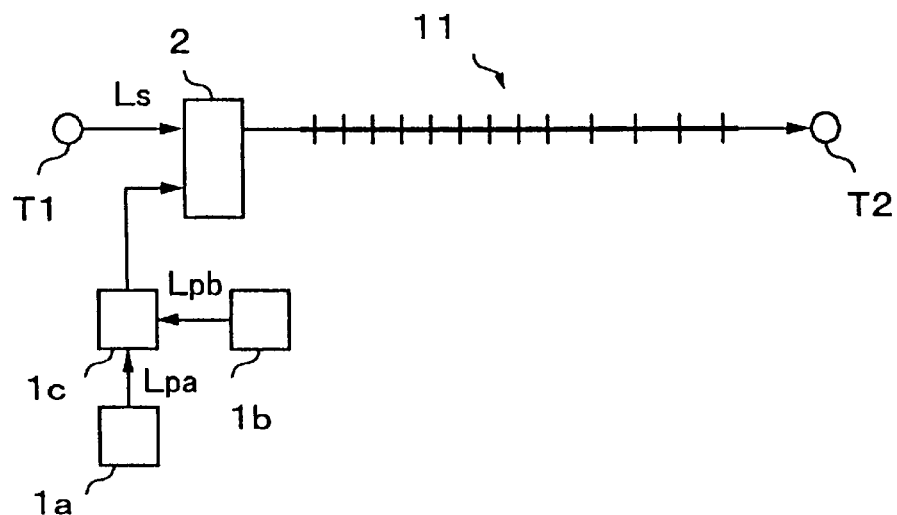
FIG. 9 is a schematic view showing a constitution of an optical fiber amplifier according to a third embodiment of the present invention.

FIG. 9 is a schematic view showing a constitution of an optical fiber amplifier according to a third embodiment.

In FIG. 9, the constitution of this optical fiber amplifier is differentiated from that of the second embodiment in that the former adopts two pumping light sources 1a, 1b and a pumping light multiplexer 1c. Other constitution is identical with that of the second embodiment.

Figure 10:
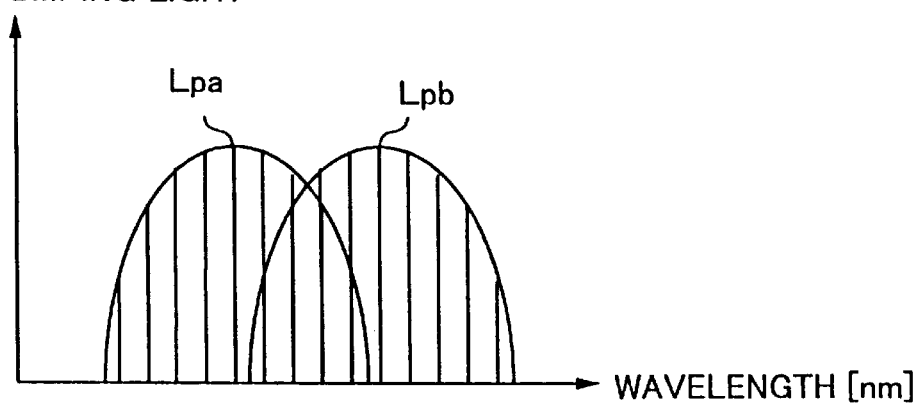
FIG. 10 is a diagram showing output spectra of each of pumping light sources in the third embodiment.

The pumping light sources 1a, 1b generate pumping lights having central wavelengths offset from each other such as shown in FIG. 10. Here, the pumping light Lpa generated at the pumping light source 1a corresponds to the pumping light at shorter side wavelength, and the pumping light Lpb generated at the pumping light source 1b corresponds to the pumping light at longer side wavelength, of the second embodiment, respectively. The pumping light multiplexer 1c serves to multiplex the pumping lights Lpa and Lpb output from the pumping light sources 1a and 1b, respectively, and then to output them to the multiplexer 2.

In such an optical fiber amplifier, the pumping lights Lpa and Lpb generated by pumping light sources 1a, 1b, respectively, are input into one end of active optical fiber 11, via the pumping light multiplexer 1c and the multiplexer 2. Within the active optical fiber 11, the pumping light Lpa having a shorter central wavelength is mainly reflected at the signal light input side, and the pumping light Lpb having a longer central wavelength is mainly reflected at the signal light output side. Thus, the pumping light Lpa is mainly distributed in the signal light input end side, and the pumping light Lpb is mainly distributed in the signal light output end side. Upon input of signal light Ls into the active optical fiber 11, the signal light Ls is amplified in a manner similar to the second embodiment, so that generation of noises at the signal light input side of active optical fiber 11 is restricted and the optical amplification effect at the signal light output side is enhanced.

According to the third embodiment, even by adopting two pumping light sources having central wavelengths different from each other, there can be provided an optical fiber amplifier of low noise factor and high power, similarly to the effect of the second embodiment.

In the third embodiment, there has been explained a case of forward pumping. However, it is applicable to conduct a backward pumping or bi-directional pumping. Further, although two pumping light sources have been adopted, it is possible to combine three or more pumping light sources, such as by adopting a polarized wave synthesizer.

There will be explained hereinafter a fourth embodiment.

Figure 11:
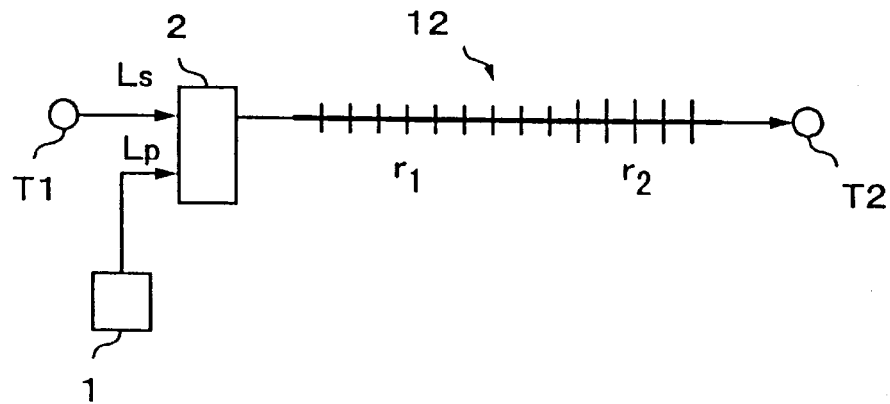
FIG. 11 is a schematic view showing a constitution of an optical fiber amplifier according to a fourth embodiment of the present invention.

FIG. 11 is a schematic view showing a constitution of an optical fiber amplifier according to a fourth embodiment of the present invention.

In FIG. 11, this optical fiber amplifier adopts an active optical fiber 12 having reflectance per unit length which varies along the longitudinal direction, instead of the active optical fiber 10 adopted in the first embodiment. Other constitution is identical with that of the first embodiment.

The active optical fiber 12 is characterized in that it is formed with fiber gratings over the entire longitudinal direction region of optical fiber, such that the reflectances per unit length have different values at the input side and the opposite side thereto. Concretely, the fiber gratings are formed such that the reflectance $r_1$ at the pumping light input side becomes lower than the reflectance $r_2$ at the opposite side. In FIG. 11, the state of reflectances are schematically shown corresponding to the lengths of a plurality of line segments perpendicular to the optical fiber. Here, the input side and opposite side shall cover those regions including the central part of the optical fiber. Further, the central reflection wavelengths of fiber gratings are supposed to be uniform along the longitudinal direction of optical fiber, similarly to the first embodiment.

There is now considered a power distribution of pumping light within the active optical fiber 12.

Figure 12:
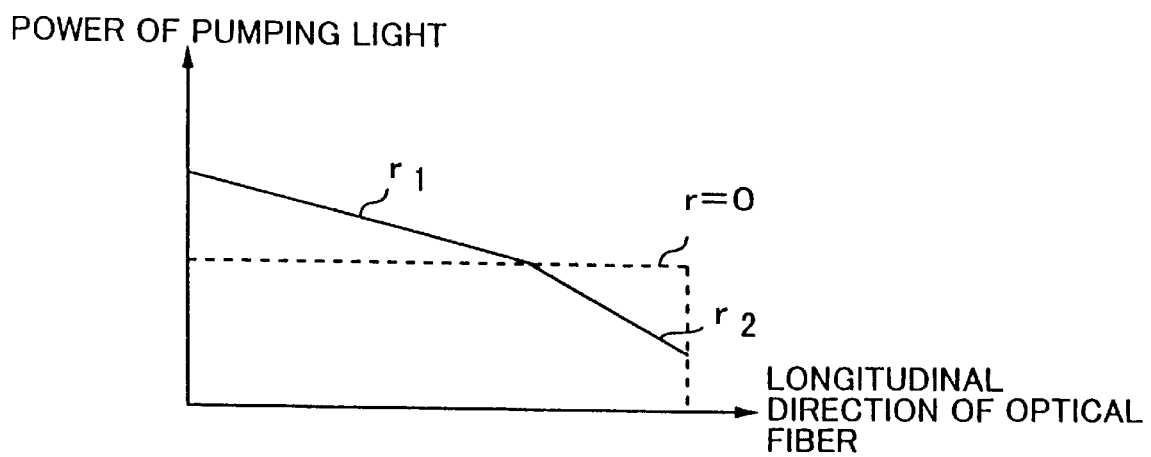
FIG. 12 is a diagram showing an exemplary calculation of a power distribution of pumping light within the active optical fiber of the fourth embodiment.
Figure 12:
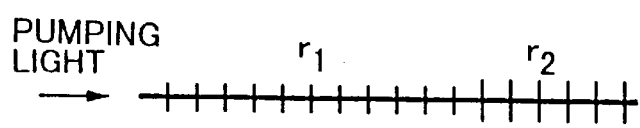

FIG. 12 is an exemplary calculation based on the equation (7), by applying the aforementioned analytic model to the active optical fiber 12.

The power distribution of pumping light shown in FIG. 12(*a*) results from a calculation where the fiber gratings have two types of reflectances $r_1$, $r_2$ ($r_1 < r_2$) as shown in FIG. 12(*b*). From FIG. 12(*a*), it is seen that the power of pumping light at the pumping light input side is increased through a region wider than the case where the reflectances are uniform (FIG. 5).

In the forward pumping type of optical fiber amplifier adopting such an active optical fiber 12, upon input of the pumping light Lp via the multiplexer 2 into one end of the active optical fiber 12, there is established such a state that a sufficient power of pumping light exists at the pumping light input side (signal light input side) of active optical fiber 12 as shown in FIG. 12(*a*). Upon input of the signal light Ls into the active optical fiber 12 under such a state, the amplification effect for signal light Ls becomes larger at the input side, so that the pumping efficiency over the entire optical fiber amplifier becomes higher than the first embodiment. This can be also understood by the fact that, in FIG. 12(*a*), the area surrounded by a solid line indicating the calculation result is wider than that surrounded by a dotted line (corresponding to the first embodiment).

Therefore, according to the fourth embodiment, the reflectances per unit length of fiber gratings are established such that the reflectance at the side opposite to the pumping light input side is higher, thereby enabling to improve the conversion efficiency of pumping light Lp.

Figure 13:
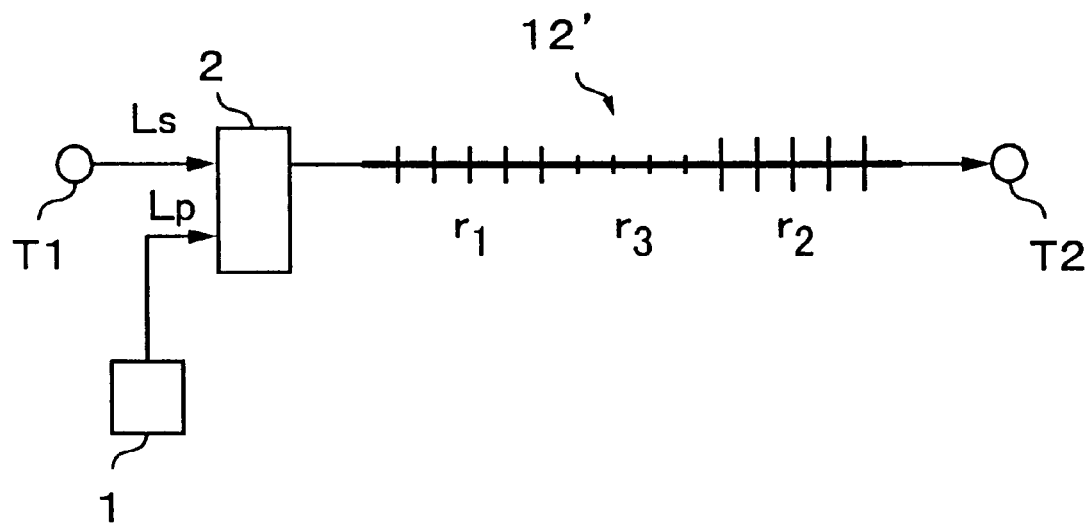
FIG. 13 is a diagram showing another exemplary constitution of the fourth embodiment in which the reflectance at a central part of the optical fiber is varied.

In the fourth embodiment, there has been explained such a case that the active optical fiber 12 has two types of reflectances $r_1$, $r_2$. However, without limited thereto, it is also possible to adopt an active optical fiber 12' which is established such that the reflectance $r_3$ at the central part of active optical fiber is further smaller than the reflectance $r_1$ at the input side of pumping light, such as shown in FIG. 13. By utilizing this active optical fiber 12', a large power of pumping light is rendered to exist also in the central part of optical fiber, so that the conversion efficiency of pumping light can be further improved. Although the central reflection wavelength has been made uniform along the longitudinal direction, it is possible to establish different central reflection wavelengths correspondingly to the wavelength ranges of the pumping light Lp, similarly to the second and third embodiments as described above.

There will be explained hereinafter a fifth embodiment.

Figure 14:
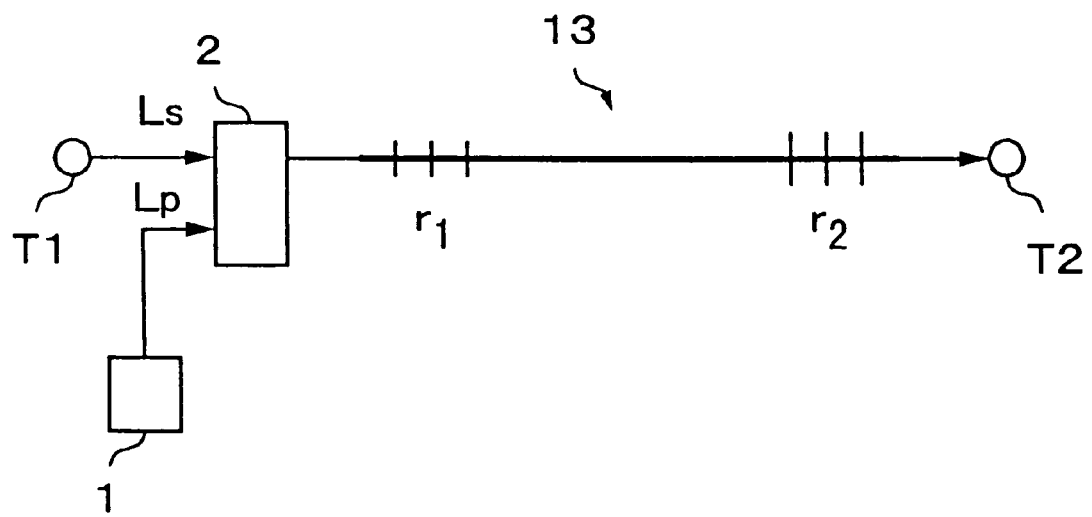
FIG. 14 is a schematic view showing a constitution of an optical fiber amplifier according to a fifth embodiment of the present invention.

FIG. 14 is a schematic view showing a constitution of an optical fiber amplifier according to the fifth embodiment of the present invention.

In FIG. 14, this optical fiber amplifier is characterized in that it adopts an active optical fiber 13 formed with fiber gratings only adjacent to both ends of optical fiber, respectively, instead of the active optical fiber 10 adopted in the first embodiment. Other constitution is identical with that of the first embodiment.

The active optical fiber 13 is characterized in that it is formed with fiber gratings only adjacent to both ends of optical fiber, respectively, and no gratings are applied in the central part. In this case, it is assumed that the reflectance $r_1$ per unit length at the pumping light input side (signal light input side) is established to be smaller than the reflectance $r_2$ at the opposite side (signal light output side), and the central reflection wavelengths near the respective ends are uniform.

There is now considered a power distribution of pumping light within the active optical fiber 13.

Figure 15:
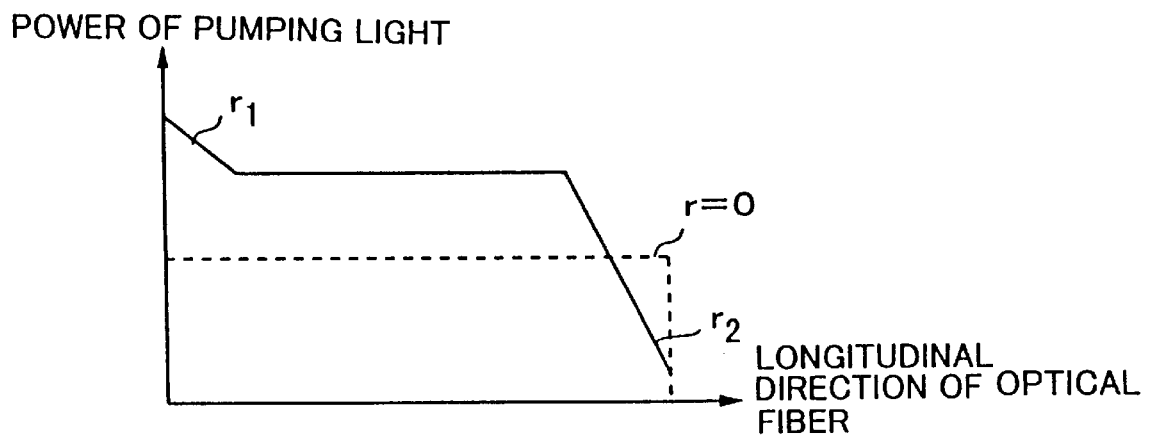
FIG. 15 is a diagram showing an exemplary calculation of a power distribution of pumping light within the active optical fiber of the fifth embodiment.
Figure 15:

FIG. 15 is an exemplary calculation based on the equation (7), by applying the aforementioned analytic model to the active optical fiber 13.

The power distribution of pumping light shown in FIG. 15(*a*) results from a calculation where the fiber gratings are distributed only at the pumping light input side of the optical fiber and the opposite side thereof as shown in FIG. 15(*b*), and the respective reflectances $r_1$, $r_2$ ($r_1 < r_2$) are different from each other. From FIG. 15(*a*), it is seen that the power of pumping light at the pumping light input side is increased in a wider region, so that the area surrounded by a solid line indicating the calculation result becomes wider than the exemplary calculation (see FIG. 12) of the fourth embodiment.

An operation of such an optical fiber amplifier is basically identical with the fourth embodiment, so that the largest power of pumping light exists at the pumping light input side of active optical fiber 13 and a relatively large power of pumping light also exists in the central part. As can be understood from the area surrounded by the solid line in FIG. 15(a), the conversion efficiency of pumping light Lp can be improved further than that of the fourth embodiment.

In the fifth embodiment, there has been explained a case of forward pumping. However, it is applicable to conduct a backward pumping. In such a case, the reflectance per unit length at the pumping light input side (signal light output side) is established to be lower than the reflectance at its opposite side (signal light input side). Further, although the central reflection wavelengths at respective end parts have been made to be uniform, it is possible to establish different central reflection wavelengths correspondingly to the wavelength range of the pumping light Lp, similarly to the second and third embodiments as described above.

There will be explained hereinafter a sixth embodiment.

Figure 16:
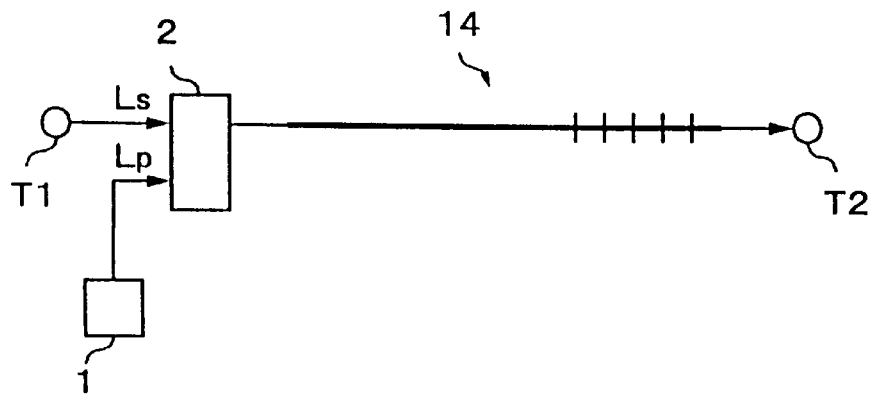
FIG. 16 is a schematic view showing a constitution of an optical fiber amplifier according to a sixth embodiment of the present invention.

FIG. 16 is a schematic view showing a constitution of an optical fiber amplifier according to the sixth embodiment of the present invention.

In FIG. 16, this optical fiber amplifier is characterized in that it adopts an active optical fiber 14 formed with fiber gratings only adjacent to one end of optical fiber opposite to the pumping light input side, instead of the active optical fiber 10 adopted in the first embodiment. Other constitution is identical with that of the first embodiment.

The active optical fiber 14 is, in case of forward pumping, formed with fiber gratings only adjacent to one end (signal light output end) opposite to the other end (signal light input end) into which the pumping light Lp is input, and no fiber gratings are applied to the pumping light input side and the central part.

There is now considered a power distribution of pumping light within the active optical fiber 14.

Figure 17:
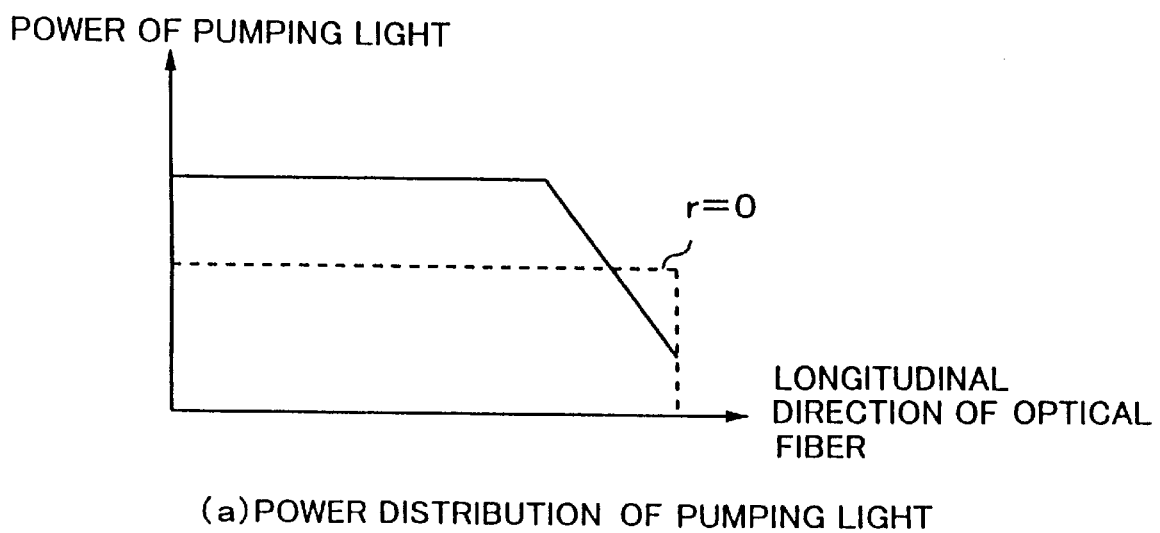
FIG. 17 is a diagram showing an exemplary calculation of a power distribution of pumping light within the active optical fiber of the sixth embodiment.
Figure 17:
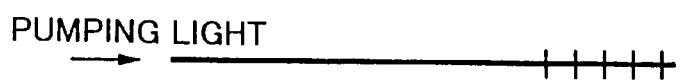

FIG. 17 is an exemplary calculation based on the equation (7), by applying the aforementioned analytic model to the active optical fiber 14.

The power distribution of pumping light shown in FIG. 17(a) results from a calculation where the fiber gratings are distributed only at the side opposite to the pumping light input side of the optical fiber, as shown in FIG. 17(b), and the reflectances are uniform. From FIG. 17(a), it is seen that the power of pumping light at the pumping light input side is increased in a wider region. Further, it is also seen that the area surrounded by a solid line indicating the calculation result becomes wider than that surrounded by a dotted line (corresponding to the first embodiment), so that the conversion efficiency of pumping light is improved.

According to the sixth embodiment, there can be provided the active optical fiber 14 applied with the fiber gratings only adjacent to that end opposite to the pumping light input side, whereby an optical fiber amplifier can be provided which has a higher conversion efficiency of pumping light Lp, as compared to the first embodiment in which the fiber gratings are formed over the entire longitudinal direction region of optical fiber. It is noted that the aforementioned technique, to reflect the pumping light Lp at the side opposite to the pumping light input side, is identical to the conventional optical fiber amplifier in which an optical reflector is added to an outside of an active optical fiber. However, in the present embodiment, the fiber gratings for reflecting the pumping light Lp are formed within the active optical fiber, thereby providing such an effect that no insertion loss and coupling loss of optical reflector are caused.

In the sixth embodiment, there has been explained a case of forward pumping. However, backward pumping may be adopted.

There will be explained hereinafter a seventh embodiment of the present invention.

Figure 18:
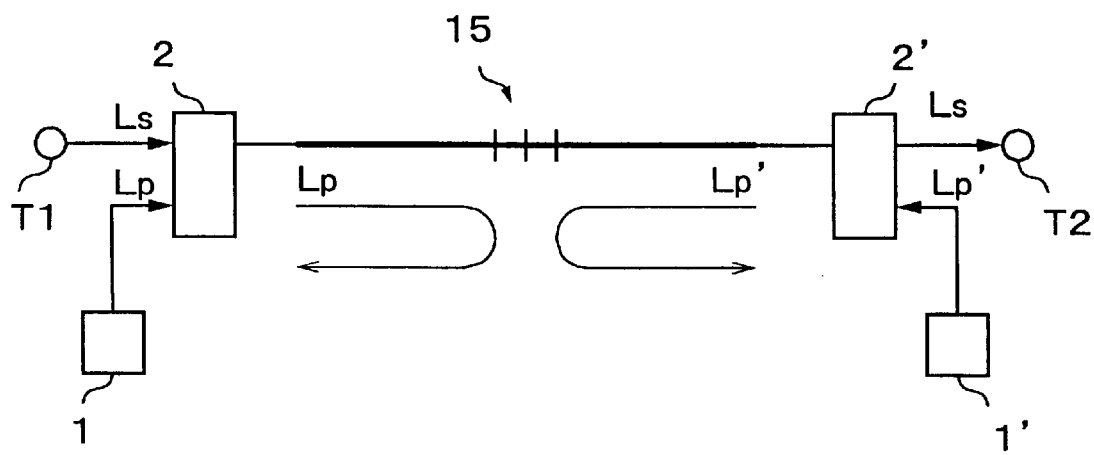
FIG. 18 is a schematic view showing a constitution of an optical fiber amplifier according to a seventh embodiment of the present invention.

FIG. 18 is a schematic view showing a constitution of an optical fiber amplifier according to the seventh embodiment.

In FIG. 18, this optical fiber amplifier is characterized in that it adopts an active optical fiber 15 formed with fiber gratings only at the central part of optical fiber in the optical fiber amplifier of bi-directional pumping such as shown in FIG. 8, instead of the active optical fiber 11 which is formed with the fiber gratings over the entire longitudinal direction region. Further, it is assumed that the central wavelength of the pumping light Lp generated by the pumping light source 1 and that of the pumping light Lp' generated by a pumping light source 1' are different from each other. Here, the central wavelength of the pumping light Lp is established to be shorter than that of the pumping light Lp'. Other constitution is identical with the optical fiber amplifier shown in FIG. 8.

The active optical fiber 15 is, only at the central part thereof, formed with fiber gratings having two central reflection wavelengths corresponding to the central wavelengths of the pumping light sources 1, 1', respectively, and no fiber gratings are formed adjacent to either ends of the optical fiber.

In such an optical fiber amplifier, upon input of pumping lights Lp and Lp' having central wavelengths different from each other into the respective ends of active optical fiber 15 from pumping light sources 1, 1' via multiplexers 2, 2', respectively, each of pumping light-beams Lp, Lp' propagates through bi-diretions and then is reflected by the fiber gratings at the central part so as to go and return through one side halves of active optical fiber 15, respectively. This results in increase of each of the power of pumping lights at the respective input sides (input and output sides of signal light) of pumping lights Lp, Lp', respectively.

According to the seventh embodiment, it becomes possible to improve the pumping efficiency, by adopting the active optical fiber 15 in case of bi-directional pumping.

In the seventh embodiment, respective one pumping light sources are provided at the front and rear sides of the fiber, respectively. However, without limited thereto, it is possible to provide a plurality of pumping light sources, at the front and rear sides of the fiber, respectively. In such a case, the central reflection wavelengths of the fiber gratings of the active optical fiber 15 shall be established to correspond to the central wavelengths of pumping lights to be generated by the respective pumping light sources.

There will be explained hereinafter an eighth embodiment of the present invention.

In this eighth embodiment, there will be explained an optical fiber amplifier the conversion efficiency of pumping light of which is further increased such as by combining two active optical fibers 14 adopted in the sixth embodiment.

Figure 19:
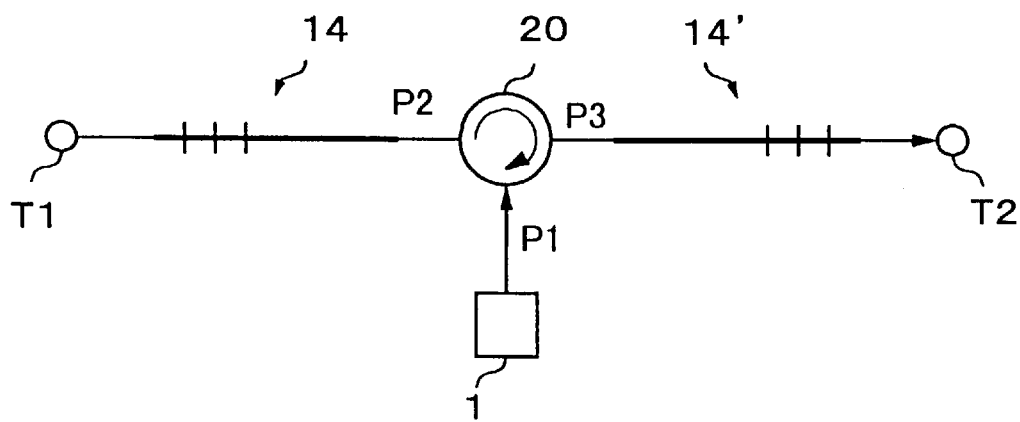
FIG. 19 is a schematic view showing a constitution of an optical fiber amplifier according to an eighth embodiment of the present invention.

FIG. 19 is a schematic view showing a constitution of an optical fiber amplifier according to the eighth embodiment.

In FIG. 19, this optical fiber amplifier includes such as two active optical fibers 14, 14' connected via 3-port optical circulator 20. First port P1 of this optical circulator 20 is coupled to the output terminal of pumping light source 1 via an isolator not shown, and second and third ports P2, P3 are coupled to those side ends of active optical fibers 14, 14', respectively, which side ends are not formed with fiber gratings. Further, input and output terminals T1, T2 are connected to the fiber grating side ends of active optical fibers 14, 14', respectively. In this case, respective fiber gratings formed within active optical fibers 14, 14' serve as first and second light reflection devices.

The optical circulator 20 functions to transmit the light in one direction only, among the ports, and in this case, from first port P1 to second port P2, from second port P2 to third port P3, and from third port P3 to first port P1, as indicated by an arrow in FIG. 19.

In such an optical fiber amplifier, the pumping light Lp generated at the pumping light source 1 is input into the first port P1 of optical circulator 20 via the isolator, and then transmitted from the second port P2 to the active optical fiber 14. The pumping light Lp input into the active optical fiber 14 is reflected by the fiber gratings of active optical fiber 14 so as to return to the second port P2 of optical circulator 20, and then sent into the active optical fiber 14' via the third port P3. The pumping light Lp input into the active optical fiber 14' is reflected by the fiber gratings of active optical fiber 14' so as to return to the third port P3 of optical circulator 20, and then output from the first port P1. As described above, the pumping light Lp generated by the pumping light source 1 is rendered to make one-reciprocation in each of the active optical fibers 14, 14', via the optical circulator 20. The pumping light Lp output from the first port P1 is prevented from entering the pumping light source 1, by means of the isolator. The signal light Ls from the input terminal T1 is sequentially transmitted through the active optical fibers 14, 14' which have been supplied with the pumping light Lp in the above manner, so that the signal light Ls is amplified and finally output from the output terminal T2 to the outside.

According to the eighth embodiment, the pumping light Lp generated by the pumping light source 1 is enabled to go and return through two lines of active optical fibers 14, 14', so that the conversion efficiency of pumping light Lp can be further increased.

Figure 20:
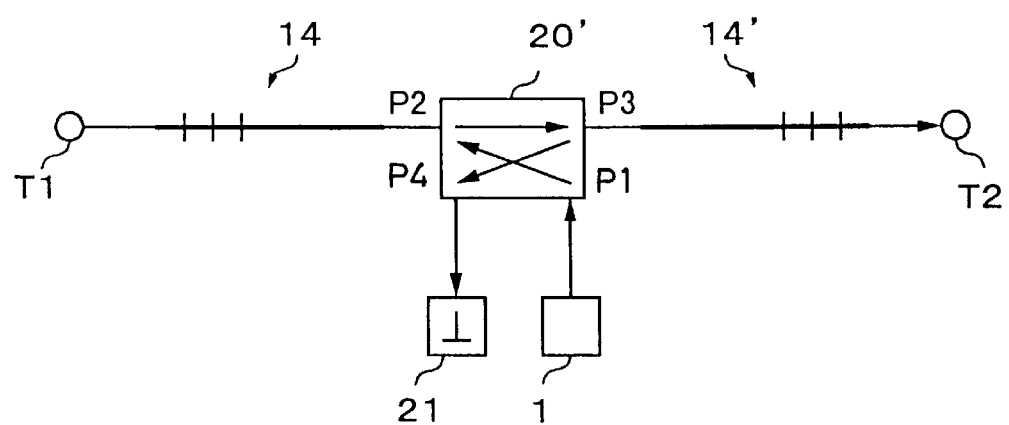
FIG. 20 is a diagram showing another exemplary constitution of the eighth embodiment adopting a 4-port optical circulator.

In the eighth embodiment, the two lines of active optical fibers 14, 14' are connected by the 3-port optical circulator 20. However, the present invention is not limited thereto. For example, it is possible to connect the active optical fibers 14, 14' with each other, by a 4-port optical circulator 20' such as shown in FIG. 20. In this case, the pumping light returned to the third port P3 is sent to an optical terminator 21 via fourth port P4, so that no isolators are required between the first port P1 of optical circulator and the pumping light source 1.

Figure 21:
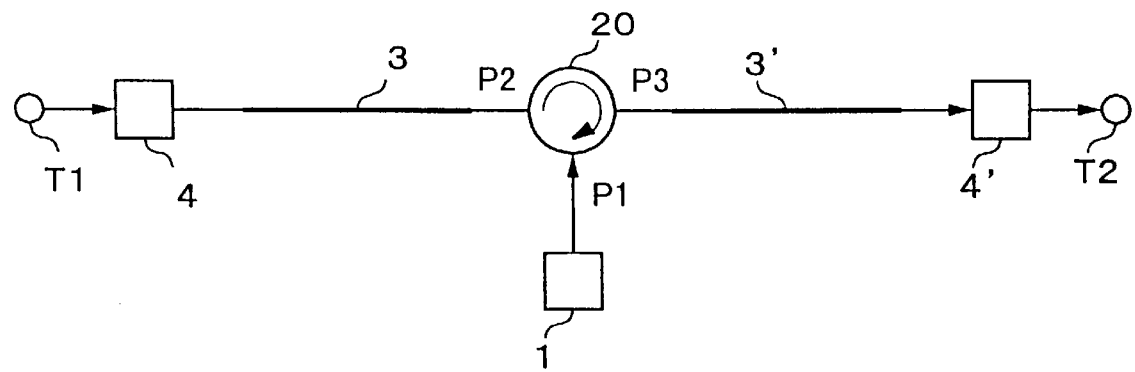
FIG. 21 is a diagram showing yet another exemplary constitution of the eighth embodiment using the active optical fiber to which external optical reflectors are attached.
Figure 22:
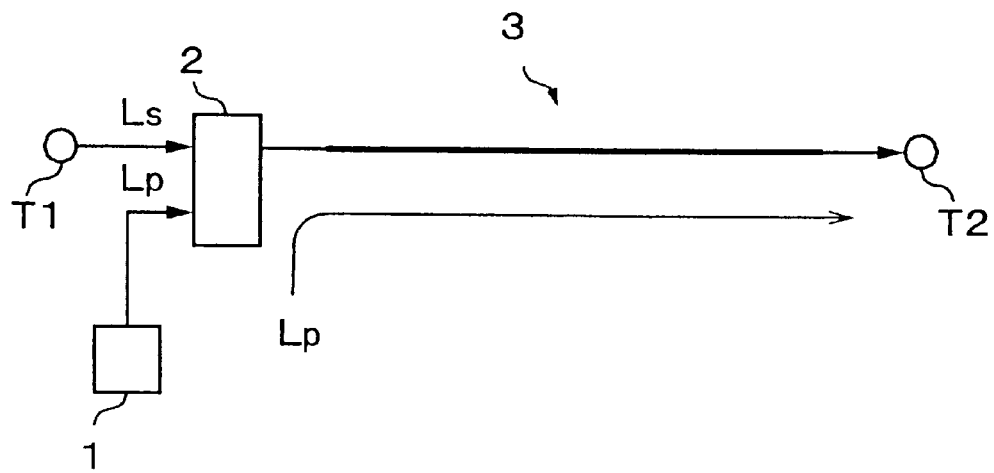
FIG. 22 is a diagram showing an exemplary basic constitution of a conventional optical fiber amplifier.
Figure 23:
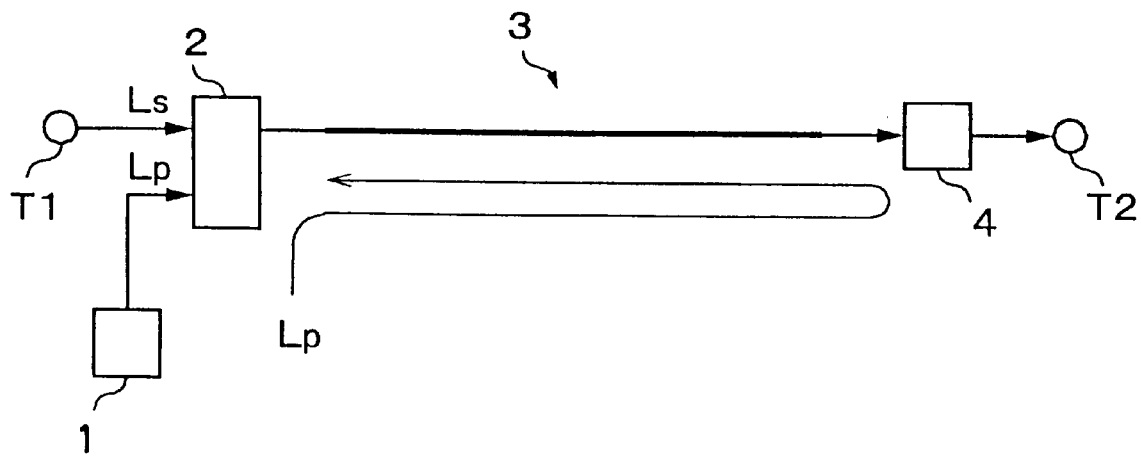
FIG. 23 is a diagram showing an exemplary constitution of a conventional optical fiber amplifier externally attached with an optical reflector.

In addition, although there have been adopted two lines of active optical fibers 14 each formed with fiber gratings adjacent to one end, it is possible to adopt either of the active optical fibers 10 through 13 adopted in the above embodiments. Further, as shown in FIG. 21, it is also possible to constitute an optical fiber amplifier comparable to the aforementioned ones, by combining two lines of active optical fibers 3, 3' to which conventional optical reflectors 4, 4' are externally coupled respectively. In this case, the pumping efficiency can be improved more than such a case that an active optical fiber to which one optical reflector is coupled is used alone. The pumping efficiency in this case is lower than that of the eighth embodiment, due to the insertion loss and coupling loss of each of optical reflectors 4, 4'.

What we claimed are:

1. An active optical fiber doped with a rare earth element and having opposing ends, comprising:
   a pumping light reflection area arranged along the longitudinal direction within said optical fiber, over a predetermined region including at least the areas adjacent respectively to the opposing ends of the optical fiber, said pumping light reflection area being provided with diffraction gratings which transmit a signal light and reflect a pumping light.

2. An active optical fiber of claim 1, wherein
   said pumping light reflection area is provided with said diffraction gratings arranged over the entire longitudinal direction region of said optical fiber.

3. An active optical fiber of claim 2, wherein
   said pumping light reflection area is provided with two or more of diffraction gratings having central reflection wavelengths different from each other, in the longitudinal direction of said optical fiber.

4. An active optical fiber of claim 3, wherein
   said pumping light reflection area is provided with a diffraction grating which is arranged adjacent to a signal light input end of said optical fiber, and has a central reflection wavelength corresponding to a shorter side wavelength of a wavelength range of said pumping light.

5. An active optical fiber of claim 3, wherein
   said pumping light reflection area is provided with a diffraction grating which is arranged adjacent to a signal light output end of said optical fiber, and has a central reflection wavelength corresponding to a longer side wavelength of a wavelength range of said pumping light.

6. An active optical fiber of claim 2, wherein
   said pumping light reflection area is provided with two or more of diffraction gratings having reflectances per unit length, different from each other, in the longitudinal direction of said optical fiber.

7. An active optical fiber of claim 6, wherein
   said pumping light reflection area is provided with a diffraction grating arranged adjacent to one end of said optical fiber, and a diffraction grating arranged adjacent to the opposite end of said optical fiber, and, when said pumping light is input into said one end of said optical fiber in one direction, said diffraction grating arranged adjacent to the one end of said optical fiber has a reflectance per unit length established to be lower than that of said diffraction grating arranged adjacent to the opposite end of said optical fiber.

8. An active optical fiber of claim 7, wherein
   said pumping light reflection area is provided with a diffraction grating which is arranged at a central part of said optical fiber, and has a reflectance per unit length established to be lower than that of said diffraction grating arranged adjacent to the one end of said optical fiber.

9. An active optical fiber of claim 2, wherein
   said diffraction gratings of said pumping light reflection area have central reflection wavelengths and reflectances per unit length, both uniform along the longitudinal direction of said optical fiber.

10. An active optical fiber of claim 1, wherein said pumping light reflection area is provided with diffraction gratings exclusively at areas adjacent to the opposite ends of said optical fiber, respectively.

11. An active optical fiber of claim 10, wherein
    said pumping light reflection area is provided with said diffraction grating arranged adjacent to a signal light input end of said optical fiber, which has a central reflection wavelength corresponding to a shorter side wavelength of a wavelength range of said pumping light.

12. An active optical fiber of claim 10, wherein
    said pumping light reflection area is provided with said diffraction grating arranged adjacent to a signal light output end of said optical fiber, which has a central reflection wavelength corresponding to a longer side wavelength of a wavelength range of said pumping light.

13. An active optical fiber of claim 10, wherein said pumping light reflection area is provided with a diffraction grating arranged adjacent to one end of said optical fiber, and a diffraction grating arranged adjacent to the opposite end of said optical fiber, and, when said pumping light is input into said one end of said optical fiber in one direction, and said diffraction grating arranged adjacent to the one end of said optical fiber has a reflectance per unit length established to be lower than that of said diffraction grating arranged adjacent to the opposite end of said optical fiber.

14. An active optical fiber doped with a rare earth metal, comprising:

a pumping light reflection area provided with diffraction gratings exclusively arranged at the central part of said optical fiber, along the longitudinal direction within said optical fiber, such that when pumping lights are input into opposite ends of said optical fiber in opposite directions, respectively, signal light is transmitted and pumping light is reflected.

15. An active optical fiber of claim 14, wherein said diffraction grating of said pumping light reflection area has a reflection wavelength range which covers two or more wavelengths different from each other.

16. An active optical fiber of claim 14, wherein said diffraction grating comprises a fiber grating.

17. An active optical fiber of claim 14, wherein said rare earth element comprises Erbium.

18. An optical fiber amplifier comprising an active optical fiber doped with a rare earth element and having opposing ends, at least one pumping light source for generating a pumping light, and at least one multiplexing part for inputting said pumping light from said pumping light source into said active optical fiber, wherein said optical fiber amplifier further comprises a pumping light reflection area arranged along the longitudinal direction within said active optical fiber, over a predetermined region including at least the areas adjacent respectively to the first and second ends of the optical fiber, said pumping light reflection area being provided with diffraction gratings which transmit signal light and reflect pumping light.

19. An optical fiber amplifier of claim 18, wherein said pumping light reflection area is provided with said diffraction gratings arranged over the entire longitudinal region of said optical fiber.

20. An optical fiber amplifier of claim 19, wherein said pumping light reflection area is provided with two or more of diffraction gratings having central reflection wavelengths different from each other, in the longitudinal direction of said optical fiber.

21. An optical fiber amplifier of claim 20, wherein said pumping light reflection area is provided with a diffraction grating which is arranged adjacent to a signal light input end of said optical fiber, and has a central reflection wavelength corresponding to a shorter side wavelength of a wavelength range of said pumping light generated by said pumping light source.

22. An optical fiber amplifier of claim 20, wherein said pumping light reflection area is provided with a diffraction grating which is arranged adjacent to a signal light output end of said optical fiber, and has a central reflection wavelength corresponding to a longer side wavelength of a wavelength range of said pumping light generated by said pumping light source.

23. An optical fiber amplifier of claim 19, wherein said pumping light reflection area is provided with two or more of diffraction gratings having reflectances per unit length, different from each other, in the longitudinal direction of said optical fiber.

24. An optical fiber amplifier of claim 23, wherein said pumping light reflection area is provided with a diffraction grating arranged adjacent to one end of said optical fiber, and a diffraction grating arranged adjacent to the opposite end of said optical fiber, and when said pumping light generated by said pumping light source is input into said one end of said optical fiber in one direction via said multiplexing part, said diffraction grating arranged adjacent to the one end of said optical fiber has a reflectance per unit length established to be lower than that of said diffraction grating arranged adjacent to the opposite end of said optical fiber.

25. An optical fiber amplifier of claim 24, wherein said pumping light reflection area is provided with a diffraction grating arranged at a central part of said optical fiber, which has a reflectance per unit length established to be lower than that of said diffraction grating arranged adjacent to the one end of said optical fiber.

26. An optical fiber amplifier of claim 19, wherein said diffraction gratings of said pumping light reflection area have central reflection wavelengths and reflectances per unit length, both uniform along the longitudinal direction of said optical fiber.

27. An optical fiber amplifier of claim 18, wherein said pumping light reflection area is provided with diffraction gratings exclusively at areas adjacent to the opposite ends of said optical fiber, respectively.

28. An optical fiber amplifier of claim 27, wherein said pumping light reflection area is provided with said diffraction grating which is arranged adjacent to a signal light input end of said optical fiber, and has a central reflection wavelength corresponding to a shorter side wavelength of a wavelength range of said pumping light generated by said pumping light source.

29. An optical fiber amplifier of claim 27, wherein said pumping light reflection area is provided with said diffraction grating which is arranged adjacent to a signal light output end of said optical fiber, and has a central reflection wavelength corresponding to a longer side wavelength of a wavelength range of said pumping light generated by said pumping light source.

30. An optical fiber amplifier of claim 29, further comprising:

a first pumping light source for generating a pumping light having a central wavelength at a shorter side wavelength, a second pumping light source for generating a pumping light having a central wavelength at a longer side wavelength, a first multiplexing part for inputting said pumping light from said first pumping light source into a signal light input end of said active optical fiber, and a second multiplexing part for inputting said pumping light from said second pumping light source into a signal light output end of said active optical fiber, and wherein said both pumping lights are input into one and the opposite ends of said active optical fiber in one and the opposite directions, respectively.

31. An optical fiber amplifier of claim 27, wherein said pumping light reflection area is provided with said diffraction grating arranged adjacent to the one end of said optical fiber, and said diffraction grating arranged adjacent to the opposite end of said optical fiber, and when said pumping light generated by said pumping light source is input into said one end of said optical fiber in one direction via said multiplexing part, said diffraction grating arranged adjacent to the one end of said optical fiber has a reflectance per unit length established to be lower than that of said diffraction grating arranged adjacent to the opposite end of said optical fiber.

32. An optical fiber amplifier comprising:

an active optical fiber doped with a rare earth element, a first pumping light source for generating a pumping light having a central wavelength at a shorter side wavelength, a second pumping light source for generating a pumping light having a central wavelength at a longer side wavelength, a first multiplexing part for inputting said pumping light from said first pumping light source into a signal light input end of said active optical fiber, and a second multiplexing part for inputting said pumping light from said second pumping light source into a signal light output end of said active optical fiber, and wherein said active optical fiber is provided with a pumping light reflection area which is provided with diffraction gratings exclusively arranged at the central part of said optical fiber, along the longitudinal direction of said fiber, to transmit a signal light and reflect a pumping light.

33. An optical fiber amplifier of claim 32, wherein said diffraction grating of said pumping light reflection area has a reflection wavelength range which covers two or more wavelengths different from each other.

34. An optical fiber amplifier of claim 32, wherein said diffraction grating comprises a fiber grating.

35. An optical fiber amplifier of claim 32, wherein said rare earth element comprises Erbium.

36. An optical fiber amplifier comprising:

at least one pumping light source for generating pumping light, a first active optical fiber doped with a rare earth element, first light reflection means for reflecting said pumping light input into one end of said first active optical fiber and for transmitting signal light, a second active optical fiber doped with a rare earth element, second light reflection means for reflecting said pumping light input into one end of said second active optical fiber and for transmitting signal light, and an optical circulator, which transmits said pumping light from said pumping light source into said one end of said first active optical fiber in one direction only, and which transmits said pumping light, reflected by said first light reflection means and returned toward said one end of said first active optical fiber, into said one end of said second active optical fiber in one direction only, wherein said signal light is amplified by propagating through said first and second active optical fibers while transmitting said first and second light reflection means.

37. An optical fiber amplifier of claim 36, wherein said first light reflection means comprises a diffraction grating, which transmits said signal light and reflects said pumping light, and is arranged over a predetermined region along the longitudinal direction within said first active optical fiber.

38. An optical fiber amplifier of claim 36, wherein said second light reflection means comprises a diffraction grating, which transmits said signal light and reflects said pumping light, and is arranged over a predetermined region along the longitudinal direction within said second active optical fiber.

39. An optical fiber amplifier of claim 36, wherein said optical circulator transmits said pumping light, which is reflected by said second light reflection means and returned to said one end of said second active optical fiber, to said pumping light source in one direction only, and said pumping light source is provided with an isolator for transmitting generated pumping light to said optical circulator in one direction only.

40. An optical fiber amplifier of claim 36, wherein said optical circulator transmits said pumping light, which is reflected by said second light reflection means and returned to said one end of said second active optical fiber, to an optical terminator.

41. An active optical fiber of claim 1, wherein said pumping light reflection area is provided with said diffraction gratings so that a power distribution of pumping light within said optical fiber varies along the longitudinal direction.

42. An active optical fiber of claim 1, wherein said diffraction grating comprises a fiber grating.

43. An active optical fiber of claim 1, wherein said rare earth element comprises Erbium.

44. An optical fiber amplifier of claim 18, wherein said pumping light reflection area is provided with said diffraction gratings so that a power distribution of pumping light within said optical fiber varies along the longitudinal direction.

45. An optical fiber amplifier of claim 18, wherein said diffraction grating comprises a fiber grating.

46. An optical fiber amplifier of claim 18, wherein said rare earth element comprises Erbium.

* * * * *